Patented Feb. 19, 1924.

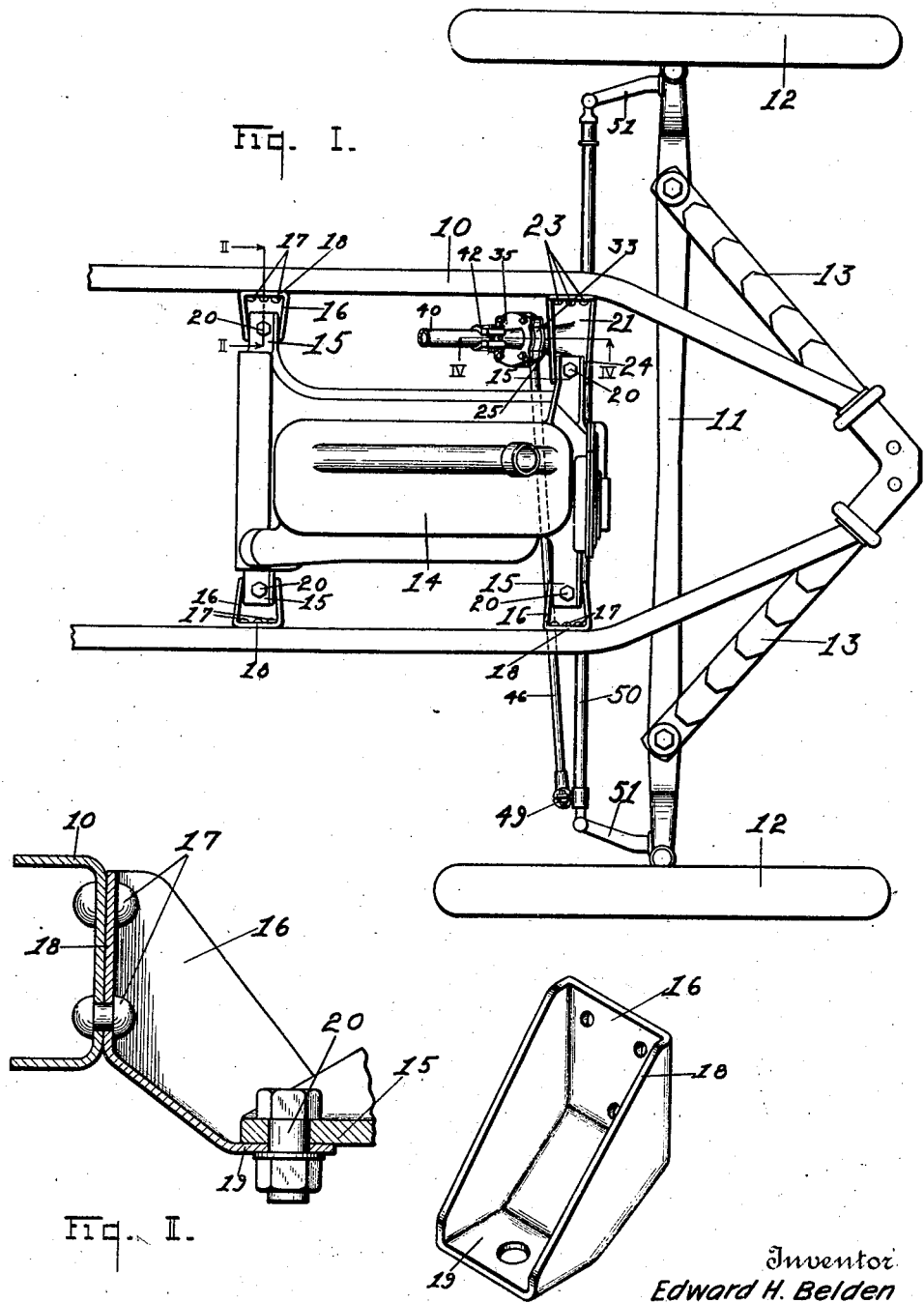

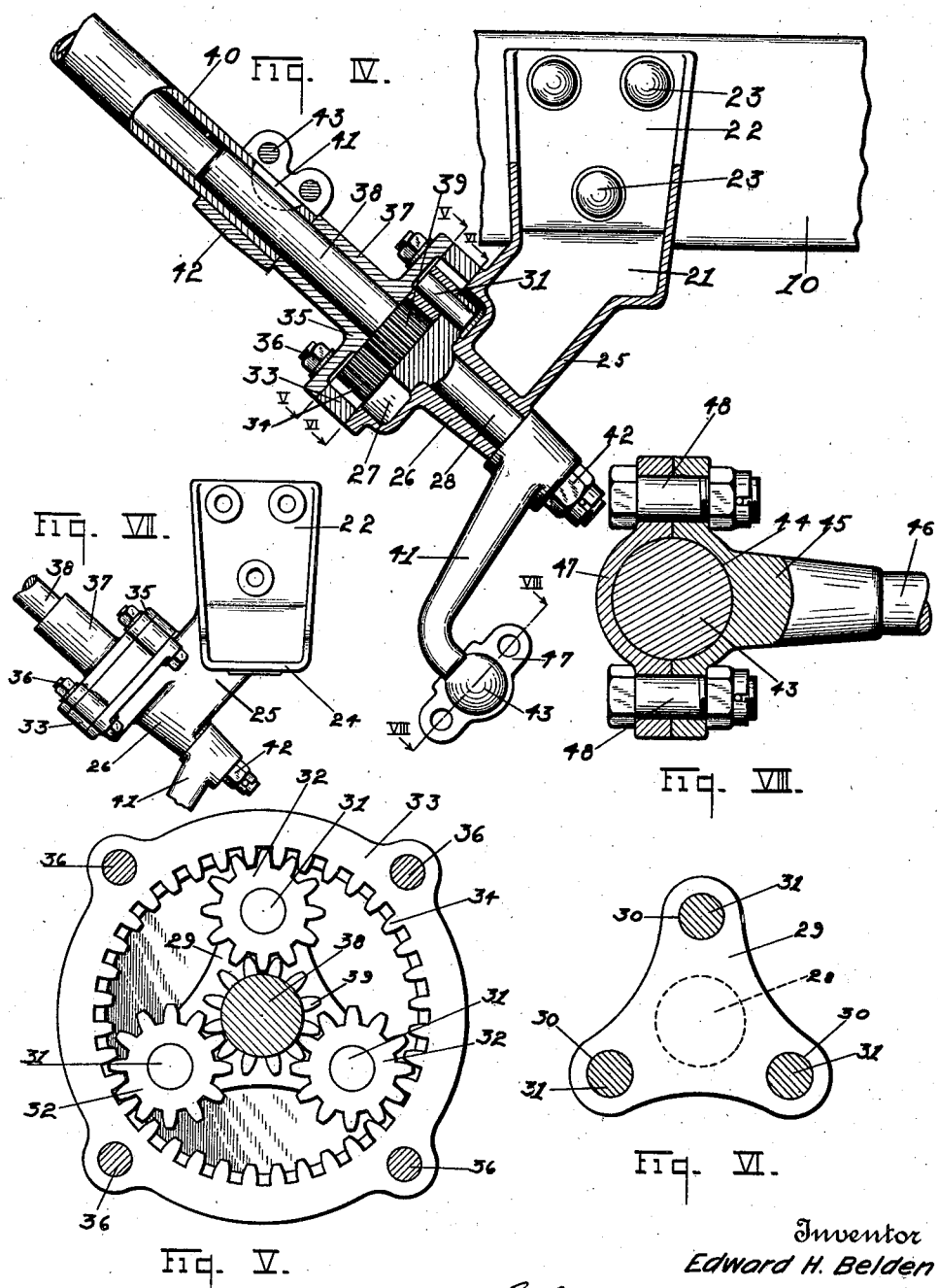

1,484,319

UNITED STATES PATENT OFFICE.

EDWARD H. BELDEN, OF TOLEDO, OHIO, ASSIGNOR, BY MESNE ASSIGNMENTS, TO THE WILLYS-OVERLAND COMPANY, OF TOLEDO, OHIO, A CORPORATION OF OHIO.

STEERING MECHANISM.

Application filed July 26, 1917. Serial No. 182,857.

*To all whom it may concern:*

Be it known that I, EDWARD H. BELDEN, a citizen of the United States, residing at Toledo, in the county of Lucas and State of Ohio, have invented certain new and useful Improvements in Steering Mechanism, of which I declare the following to be a full, clear, and exact description.

This invention relates to improvements in steering mechanism and particularly to improvements in the steering mechanism for automobiles and the location, construction and arrangement of the reduction gearing employed in connection with such mechanism.

The principal object of this invention is to provide a steering mechanism, in which the reduction gearing is so constructed and located as to minimize the torsional strain on the steering column.

A further object of my invention is to provide a simple and compact arrangement of reduction gearing to be employed in a steering mechanism, and to provide a mounting and support for the steering column, which at the same time serves to support a part of the engine from the frame of the motor vehicle.

Further objects, and objects relating to economies of manufacture and details of construction, will definitely appear from the detailed description to follow.

I accomplish the objects of my invention by the devices and means described in the following specification. My invention is clearly defined and pointed out in the appended claims.

A structure constituting a preferred embodiment of my invention is illustrated in the accompanying drawings, forming a part of this specification, in which:

Figure I is a top plan view of the forward part of a motor vehicle frame, in which my invention is embodied.

Figure II is a detail, sectional view, taken substantially on the line II of Figure I and showing in detail the connection between the engine base and the frame.

Figure III is a perspective view of one of the brackets used for connecting the engine base to the frame.

Figure IV is an enlarged, detail, fragmentary, sectional view, taken substantially on the line IV—IV of Figure I and showing in detail the reduction gearing at the lower end of the steering column.

Figure V is a detail, sectional view, taken substantially on the line V—V of Figure IV.

Figure VI is a view of the spider supporting a part of the planetary gearing, said section being taken substantially on the line VI—VI of Fig. IV.

Figure VII is a fragmentary view in side elevation showing the construction forming a support for the lower end of the steering column and the reduction gearing therefor and connecting one corner of the engine base to the frame.

Figure VIII is a detail, sectional view, taken substantially on the line VIII—VIII of Figure IV.

In the drawings, similar reference numerals refer to similar parts throughout the several views, and the sectional views are taken looking in the direction of the little arrows at the ends of the section lines.

Considering the numbered parts of the drawings, I have shown the frame 10 of a motor vehicle having the front axle 11, on which the front steering wheels 12 are mounted, said frame 10 being supported at its front end from the axle 11 by means of the springs 13. An internal combustion engine 14 has its engine base provided with the ears 15 at the corners thereof, by means of which the engine is supported from the frame. The support at three corners of the engine base is effected through the brackets 16, which are similar and interchangeable and which have a portion 18 extending vertically and fastened to the frame 10 by means of the rivets 17 and a portion 19 extending horizontally and upon which the ear 15 of the engine base is adapted to seat, said ear being secured to the horizontal portion 19 of the bracket 16 by means of the bolt 20.

At the forward left hand corner of the engine, when a left hand drive is desired, I provide a bracket 21 having a vertical portion 22, secured to the frame 10 by means of the rivets 23, and a horizontal portion 24 upon which the corresponding ear 15 extending from the engine base is adapted to seat and is secured by means of a bolt 20.

A portion 25 extends downwardly and rearwardly from the bracket 21 and has a passage 26 extending transversely therethrough and a cup shaped recess 27, extending in a plane at right angles to the passage 26, in the upper face of the arm 25. Stub shaft 28 is journaled in the passage 26 and has a spider 29 secured to or formed integral with one end thereof and disposed in the cup-shaped recess 27 in the portion 25. The spider 29 is provided with openings 30 at the ends of the arms thereof, in which the pins 31 are disposed as shown in Figures IV and VI of the drawing. The gears 32 are journaled on the ends of said pins 31. A ring 33 is secured to the face of the portion 25, said ring conforming to the cup-shaped recess 27 and forming a part of a housing. The ring 33 is provided with an internal gear 34, with which the gears 32 mesh, as shown in Figure V. A plate 35 forms a cover for and encloses the gears within the chamber formed by the cup 27 and the ring 33, said cover being secured in place by the bolts 36 which pass through the cover and through the ring 33 and are threaded into the portion 25 of the bracket 21, said cover being provided with a boss or stem 37, extending in the direction of the stub shaft 28 and provided with a passage in which the shaft 38 is journaled.

The shaft 38 carries at its lower end a gear 39, which is disposed within the chamber mentioned above meshing with the three gears 32, mounted on the pins 31. The steering column 40 has the upper end of the shaft 38 projecting into the hollow lower end thereof and secured thereto by means of a key 41, fitting a suitable slot provided in the shaft 38, and by means of a clamp 42, formed by a split collar embracing the lower end of the steering column, the parts of said split collar being secured together by the bolts 43, so as to tightly clamp the steering column to the shaft 38 to prevent movement of one relative to the other, so that as said steering column is rotated the shaft 38 will be rotated with it.

A steering arm 41 is disposed on the lower end of the stub shaft 28 and secured thereto by means of a nut 42, threaded on the end of the shaft 28, and said arm 41 is provided at its free end with a ball 43, which is disposed in a socket 44 formed in a member 45, secured to one end of the steering rod 46, as shown in Figure VIII of the drawing, said ball being held in place by the cap 47, which is secured to the part 45 by means of the bolts 48. The steering rod 46 is connected at 49 with the rod 50, connecting the usual arms 51 by means of which the motion of the steering arm 41 is communicated to the steering wheels, so as to turn them.

From the description of the parts given above, the operation of my device should be very readily understood. When the steering column 40 is rotated, the shaft 38 is caused to rotate with the steering column, thus turning the gear 39, which meshes with the gears 32, which gears also mesh with the fixed internal gear 34, carried on the inner edge of the ring 33. This arrangement of planetary gearing causes the rotation of the shaft 38 to be transmitted to the stub shaft 28, which carries the spider 29 on which the gears 32 are mounted. In the transmission of said movement from one shaft to the other, the amount of movement is reduced, while the power is increased so that a partial rotation of the steering column 40 will produce a smaller amount of movement of the stub shaft 28 and the steering arm 41. The power exerted by the steering arm 41 will be increased correspondingly. It has been customary heretofore to provide a steering mechanism in which a planetary gearing is provided at the upper end of the steering column, between the upper end of said steering column and the steering wheel, so that the gear reduction takes place at the upper end of the steering column. This is objectionable because the power which has been multiplied by reason of the reduction gearing is transmitted through the steering column, with the result that the steering column is put under torsional strain, which sometimes is highly objectionable.

The mechanism which I have provided is highly desirable because the gear reduction mechanism is located at the lower end of the steering column, so that the power, which is applied to the steering mechanism to turn the wheels, is not multiplied by reason of the reduction gearing until after it has been transmitted through the steering column to the lower end thereof, with the result that the torsional strain upon the column is minimized, inasmuch as the power used for steering the vehicle is not multiplied at so great a distance from the point of application and the multiplied power is not transmitted through the steering column, which is especially subject to torsional strain.

The bracket 21 supports the engine base, or rather one corner of the engine base, and at the same time forms a support for the steering column and the gear reduction mechanism at the lower end of the steering column. This affords a very cheap and convenient construction and one which is desirable from many standpoints.

I am aware that the particular embodiment of my invention, which I have here shown and described, is susceptible of considerable variation without departing from the spirit of my invention. I have found, however, that this particular embodiment is desirable from many standpoints, and, therefore, I desire to claim the same specifically, as well as broadly, as indicated by the appended claims.

Having thus described my invention, what

I claim as new and desire to secure by Letters Patent is:—

1. In a steering mechanism for motor vehicles, the combination of a supporting bracket provided with a recess and carrying a spider disposed in said recess; a shaft carried by said bracket and provided with a steering arm; pinions rotatably mounted on the arms of said spider; a ring mounted on said bracket and provided with an internal gear, meshing with said pinions; a plate secured to said bracket and covering said recess; a shaft journaled therein; a central pinion fixed on said shaft, and meshing with said first mentioned pinions; and a steering column having its lower end secured to said shaft.

2. In a steering mechanism for motor vehicles, the combination of a supporting bracket provided with an inclined bearing and a cup shaped recess; a shaft journaled in said bearing and carrying a spider disposed in said recess; a steering arm secured to the lower end of said shaft; pinions rotatably mounted on the arms of said spider; a ring mounted on said bracket and provided with an internal gear meshing with said pinions; a suitably journaled shaft carrying a central pinion meshing with said first mentioned pinions, and a steering column having its lower end secured to said shaft.

3. In a steering mechanism for motor vehicles, the combination of a supporting bracket provided with an inclined bearing and a cup-shaped recess; a shaft journaled in said bearing and carrying a spider disposed in said recess; a steering arm secured to the lower end of said shaft; pinions rotatably mounted on the ends of said spider; an internal gear fixed on said bracket and meshing with said pinions; a suitably journaled shaft; a central pinion carried thereby and meshing with said first mentioned pinions; and a steering column having its lower end connected to the shaft.

4. In a steering mechanism for motor vehicles, the combination of a supporting bracket provided with an inclined bearing; a shaft journaled in said bearing and carrying a spider; a steering arm secured to the lower end of said shaft; pinions rotatably mounted on the arms of said spider; a fixed internal gear meshing with said pinions; a suitably journaled shaft; a central pinion carried by and meshing with said first mentioned pinions; and a steering column having its lower end connected to said shaft.

5. In a steering mechanism for motor vehicles, the combination of a supporting bracket; a shaft journaled therein, and carrying a spider secured to the upper end thereof; a steering arm secured to the lower end thereof; pinions rotatably mounted on the arms of said spider; a fixed internal gear meshing with said pinions; a suitably journaled shaft; a central pinion carried thereby and meshing with said first mentioned pinions; and a steering column having its lower end secured to said shaft.

6. In a steering mechanism for motor vehicles, the combination of a supporting bracket provided with an inclined bearing, and a cup-shaped recess; a shaft journaled in said bearing; a steering arm secured to the lower end of said shaft; a second shaft journaled on said bracket; a steering column having its lower end connected to said second shaft; and planetary gearing connecting said shafts and housed within said recess.

7. In a steering mechanism for motor vehicles, the combination of a supporting bracket; a shaft journaled therein; a steering arm secured to the lower end of said shaft; a steering column supported on said bracket, and having a shaft suitably journaled therein; and planetary gearing connecting said shafts and housed within and carried by said bracket.

8. In a steering mechanism for motor vehicles, the combination of a frame; an engine base; a bracket having a vertical portion secured to the frame and a horizontal portion connected to the engine base; an arm extending downwardly and rearwardly from said bracket; a steering column mounted on said arm; and planetary gearing connected with said steering column and housed within and carried by said bracket.

9. In a steering mechanism for motor vehicles, the combination of a frame; an engine base; a bracket secured to said frame and said engine base and forming one of the supports for said engine base; and a steering column mounted on and carried by said bracket.

10. In a steering mechanism for motor vehicles, the combination of a steering arm, a steering column, means for connecting said arm and column, and a casing enclosing said connecting means comprising a top plate, a support forming a base plate, and a cylindrical member positioned between the top plate and the base plate.

11. In a steering mechanism for motor vehicles, a reducing gearing, a casing therefor comprising a top plate, a base member, and a cylindrical member positioned between the top plate and base member and clamped therebetween.

12. In a steering mechanism for motor vehicles, the combination of a supporting bracket provided with an inclined bearing, a stub-shaft journaled therein, a steering column mounted on and carried by said bracket in alignment with said stub shaft, and gearing connecting the lower end of said steering column with said stub shaft.

13. In a steering mechanism for motor vehicles, the combination of a supporting bracket provided with an inclined bearing, a stub-shaft journaled therein, said shaft being provided with a steering arm at its lower end and a spider at its upper end adapted to be rotatably supported by the bracket, and a steering column mounted on and carried by said bracket and adapted to rotate the shaft through said spider.

14. In a steering mechanism for motor vehicles, the combination of an inclined engine support provided with a pocket and a cover for said pocket, an internally toothed angular ring forming the sides of said pocket and secured to the support, a stub shaft carried by said support and provided with a steering arm, a steering column passing through the central portion of the cover, and in alignment with said shaft, and a planetary gearing having engagement with the toothed ring and connecting said steering column and shaft.

In testimony whereof I affix my signature.

EDWARD H. BELDEN.